US012055118B2

(12) United States Patent
Kimura

(10) Patent No.: US 12,055,118 B2
(45) Date of Patent: Aug. 6, 2024

(54) DUCT

(71) Applicant: TOYOTA BOSHOKU KABUSHIKI KAISHA, Aichi-ken (JP)

(72) Inventor: Ryusuke Kimura, Ichinomiya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 135 days.

(21) Appl. No.: 17/925,347

(22) PCT Filed: Apr. 26, 2021

(86) PCT No.: PCT/JP2021/016633

§ 371 (c)(1),
(2) Date: Nov. 15, 2022

(87) PCT Pub. No.: WO2021/235186

PCT Pub. Date: Nov. 25, 2021

(65) Prior Publication Data

US 2023/0175466 A1 Jun. 8, 2023

(30) Foreign Application Priority Data

May 18, 2020 (JP) ................................ 2020-086724

(51) Int. Cl.
*F02M 35/10* (2006.01)
*G10K 11/172* (2006.01)

(52) U.S. Cl.
CPC ................ *F02M 35/10091* (2013.01); *F02M 35/10347* (2013.01); *F02M 35/10098* (2013.01); *G10K 11/172* (2013.01)

(58) Field of Classification Search
CPC .. F02M 35/10091; F02M 35/10; F02M 35/12; F02M 35/0218; F02M 35/10347;
(Continued)

(56) References Cited

U.S. PATENT DOCUMENTS

2007/0278034 A1* 12/2007 Yamaura .......... F02M 35/10321 123/184.21
2018/0298855 A1* 10/2018 Kimura .............. F02M 35/0218
2019/0072060 A1* 3/2019 Kimura .............. B29C 65/7814

FOREIGN PATENT DOCUMENTS

CN 107731216 A * 2/2018
JP 64-69886 3/1989
(Continued)

OTHER PUBLICATIONS

Japan Office Action issued in Japan Patent Application No. 2020-86724, dated Oct. 31, 2023, together with an English translation thereof.

(Continued)

*Primary Examiner* — Syed O Hasan
(74) *Attorney, Agent, or Firm* — Greenblum & Bernstein, P.L.C.

(57) ABSTRACT

A duct includes a circumferential wall. At least part of the circumferential wall is a fibrous portion that includes fibers. The fibrous portion includes a breathable inner layer located on an inner circumferential side in the circumferential wall and an outer layer located on an outer circumferential side of the inner layer in the circumferential wall. The outer layer is less breathable than the inner layer. A boundary between the inner layer and the outer layer is breathable.

4 Claims, 4 Drawing Sheets

(58) Field of Classification Search
CPC ......... F02M 35/1216; F02M 35/10098; G10K 11/172
See application file for complete search history.

(56) References Cited

FOREIGN PATENT DOCUMENTS

| | | | | |
|---|---|---|---|---|
| JP | 2001306080 A | * | 11/2001 | |
| JP | 2004-144053 | | 5/2004 | |
| JP | 2007-321600 | | 12/2007 | |
| JP | 2018-178904 | | 11/2018 | |
| KR | 20100131202 A | * | 12/2010 | ......... F02M 35/0201 |

OTHER PUBLICATIONS

International Search Report issued in International Patent Application No. PCT/JP2021/016633, dated Jun. 15, 2021, together with English language translation thereof.

* cited by examiner

DUCT

TECHNICAL FIELD

The present disclosure relates to a duct used as, for example, an intake duct for an internal combustion engine.

BACKGROUND ART

Patent Literature 1 describes a known example of such type of a duct. Such a duct includes a first fibrous layer, a second fibrous layer, and an adsorbent located between the first and second fibrous layers. The first fibrous layer serves as an inner circumferential portion of the duct, and the second fibrous layer serves as an outer circumferential portion of the duct. The first and second fibrous layers are made of nonwoven fabric.

CITATION LIST

Patent Literature

Patent Literature 1: Japanese Laid-Open Patent Publication No. 2007-321600

SUMMARY OF INVENTION

Technical Problem

The above-described duct is made of nonwoven fabric and is thus breathable. Accordingly, the above-described duct allows the pressure of a sound wave of intake air, which flows inside the duct, to be released out of the duct. As a result, the generation of intake noise is limited when air is drawn into the duct. However, external air also enters the duct. Thus, the external air adversely affects the intake air, which flows inside the duct. This results in an increase in the pressure drop of the intake air.

It is an objective of the present disclosure to provide a duct capable of reducing the pressure drop of air flowing inside a circumferential wall of the duct while improving a sound reducing performance.

Solution to Problem

A duct that solves the above-described problem includes a circumferential wall. At least part of the circumferential wall is a fibrous portion that includes fibers. The fibrous portion includes a breathable inner layer located on an inner circumferential side in the circumferential wall and an outer layer located on an outer circumferential side of the inner layer in the circumferential wall. The outer layer is less breathable than the inner layer. A boundary between the inner layer and the outer layer is breathable.

DESCRIPTION OF EMBODIMENTS

A duct according to an embodiment will now be described with reference to the drawings.

Figure 1:
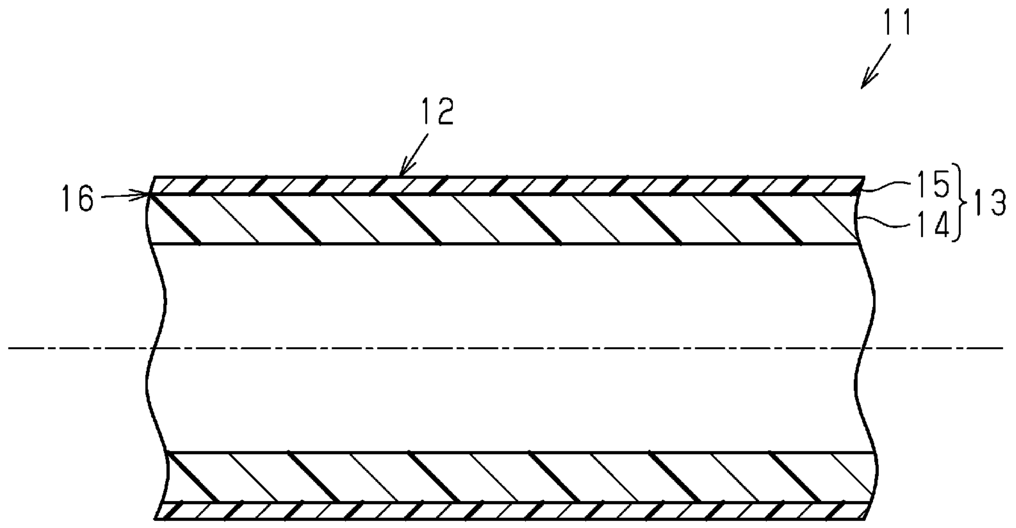
FIG. 1 is a cross-sectional view showing part of a duct according to an embodiment.

As shown in FIG. 1, a tubular duct 11 is used as, for example, an intake duct for an internal combustion engine or an air supply duct for an air conditioner. The duct 11 includes a tubular circumferential wall 12. At least part of the circumferential wall 12 is a fibrous portion 13 that includes fibers. The entire circumferential wall 12 of the present embodiment is the fibrous portion 13. The fibrous portion 13 of the present embodiment is made of nonwoven fabric formed through hot compression molding.

The fibrous portion 13 includes a tubular inner layer 14 and a tubular outer layer 15. The inner layer 14 is located on the inner circumferential side in the circumferential wall 12 and is breathable. The outer layer 15 is located on the outer circumferential side of the inner layer 14 in the circumferential wall 12 and is less breathable than the inner layer 14. The inner layer 14 and the outer layer 15 are joined to each other by interlacing nonwoven fibers of the inner layer 14 and the outer layer 15 through needle punching.

Thus, since the inner layer 14 and the outer layer 15 are joined to each other without using adhesive, a boundary 16 between the inner layer 14 and the outer layer 15 is breathable. In this case, the breathability of the boundary 16 is greater than or equal to that of the inner layer 14. That is, the boundary 16 is more breathable than the outer layer 15. The inner layer 14 is thicker than the outer layer 15. That is, the inner layer 14 has a lower compressibility than the outer layer 15.

The nonwoven fabric of the inner layer 14 and the outer layer 15 includes bicomponent fibers in which two fiber materials are mixed. Examples of the bicomponent fibers in which two fiber materials are mixed include first bicomponent fibers in which polyethylene terephthalate (PET) fibers and polypropylene (PP) fibers are mixed, second bicomponent fibers in which PET fibers and core-sheath structure PET fibers are mixed, and third bicomponent fibers in which core-sheath structure PET fibers and PP fibers are mixed.

The core-sheath structure PET fibers of the second and third bicomponent fibers are fibers with a known core-sheath structure (double-layer structure) having a core (not shown) made of PET and a sheath (not shown) made of modified PET having a melting point lower than that of the PET of the core. That is, the core-sheath structure PET fibers have a configuration in which the core (not shown) made of PET is covered by the sheath (not shown) made of modified PET having a melting point lower than that of the PET of the core.

In the first bicomponent fibers, PP functions as binder that binds PET fibers together. In the second bicomponent fibers, modified PET functions as binder that binds PET fibers together. In the third bicomponent fiber, modified PET and PP function as binder that binds PET fibers together. In the present embodiment, the nonwoven fabric of the inner layer 14 and the nonwoven fabric of the outer layer 15 are both made of the first bicomponent fibers.

Generally, nonwoven fabric has a lower breathability as the weight per unit area increases, and has a lower breathability as the mixture percentage of binder increases. However, in the present embodiment, for the breathability of the outer layer 15 to be lower than that of the inner layer 14, the weight per unit area of the nonwoven fabric of the inner layer 14 is set to be larger than the weight per unit area of the nonwoven fabric of the outer layer 15 and the mixture percentage of binder (PP) in the nonwoven fabric of the inner layer 14 is set to be smaller the mixture percentage of binder (PP) in the nonwoven fabric of the outer layer 15.

In other words, the breathability of the outer layer 15 is set to be lower than that of the inner layer 14 by setting the mixture percentage of binder (PP) in the nonwoven fabric of the inner layer 14 to be smaller than the mixture percentage of binder (PP) in the nonwoven fabric of the outer layer 15 to a greater extent than setting the weight per unit area of the nonwoven fabric of the inner layer 14 to be larger than the weight per unit area of the nonwoven fabric of the outer layer 15.

The operation of the duct 11 will now be described.

When air enters the circumferential wall 12 of the duct 11, the air generates a sound wave. When the air passes thorough the inner layer 14 of the breathable circumferential wall 12, part of the pressure of the sound wave of the air flowing inside the circumferential wall 12 vibrates the fibers of the inner layer 14. This converts the pressure into thermal energy so that the pressure is attenuated.

Thus, the generation of a stationary wave of the sound wave in the air is limited. This reduces the noise generated by the flow of the air. The sound wave of the air attenuated in the inner layer 14 is released out of the circumferential wall 12 through the boundary 16 and the outer layer 15, which are breathable. This limits the generation of noise caused by the air flowing inside the circumferential wall 12 and reduces the radiation noise released out of the circumferential wall 12.

Further, the circumferential wall 12 is breathable. Thus, the air outside the circumferential wall 12 enters the circumferential wall 12. However, in the duct 11 of the present embodiment, the outer layer 15 of the circumferential wall 12 is less breathable than the inner layer 14. This allows the outer layer 15 to effectively limit the entry of the air outside the circumferential wall 12 into the circumferential wall 12. That is, the outer layer 15 controls airflow in the fibrous portion 13 of the circumferential wall 12. This limits situations in which the air flowing inside the circumferential wall 12 is adversely affected by the air entering the circumferential wall 12 from the outside of the circumferential wall 12. Accordingly, the pressure drop of the air flowing inside the circumferential wall 12 is reduced.

If the entry of the air outside the circumferential wall 12 into the circumferential wall 12 is not limited, a gradual increase would occur in the thickness of a boundary layer which forms near the inner circumferential surface of the circumferential wall 12 and in which the viscosity of the air is not negligible. Thus, the mainstream of the air flowing inside the circumferential wall 12 would have an increased airflow resistance when that air is adversely affected by the air entering the circumferential wall 12 from the outside of the circumferential wall 12. As a result, the pressure drop of air flowing inside the circumferential wall 12 would increase.

The embodiment described above in detail has the following advantages.

(1) The duct 11 includes the circumferential wall 12. At least part of the circumferential wall 12 is the fibrous portion 13, which includes fibers. The fibrous portion 13 includes the inner layer 14 and the outer layer 15. The inner layer 14 is located on the inner circumferential side in the circumferential wall 12 and is breathable. The outer layer 15 is located on the outer circumferential side of the inner layer 14 in the circumferential wall 12 and is less breathable than the inner layer 14. The boundary 16 between the inner layer 14 and the outer layer 15 is breathable. In this structure, since the boundary 16 between the inner layer 14 and the outer layer 15 in the circumferential wall 12 is breathable, the pressure of a sound wave of the air flowing inside the circumferential wall 12 is released out of the circumferential wall 12 through the outer layer 15 while being attenuated in the inner layer 14. This limits the generation of noise caused by the air flowing inside the circumferential wall 12 and reduces the radiation noise released out of the circumferential wall 12. As a result, the sound reducing performance is improved. Further, since the outer layer 15 of the circumferential wall 12 is less breathable than the inner layer 14, the outer layer 15 limits the entry of the air outside the circumferential wall 12 into the circumferential wall 12. This limits situations in which the air flowing inside the circumferential wall 12 is adversely affected by the air entering the circumferential wall 12 from the outside of the circumferential wall 12. As a result, the pressure drop of the air flowing inside the circumferential wall 12 is reduced. The above-described structure thus reduces the pressure drop of the air flowing inside the circumferential wall 12 while improving the sound reducing performance.

(2) In the duct 11, the boundary 16 is more breathable than the outer layer 15. This structure limits situations in which the boundary 16 obstructs the control of the airflow inside and outside the circumferential wall 12 by the outer layer 15.

(3) In the duct 11, the inner layer 14 is thicker than the outer layer 15. This structure allows the inner layer 14 to effectively attenuate the pressure of a sound wave of air flowing inside the circumferential wall 12.

(4) In the duct 11, the inner layer 14 and the outer layer 15 are joined to each other by interlacing the fibers of the inner layer 14 and the outer layer 15 through needle punching. This structure allows the inner layer 14 and the outer layer 15 to be joined to each other without preparing an additional material (e.g., adhesive) used to join the inner layer 14 and the outer layer 15.

(5) In the duct 11, the entire circumferential wall 12 is the fibrous portion 13, which is breathable. Thus, as compared with when the entire circumferential wall 12 is made of non-breathable hard synthetic resin, the duct 11 is lighter.

Modifications

The above-described embodiment may be modified as follows. The above-described embodiment and the following modifications can be combined as long as the combined modifications remain technically consistent with each other.

In the duct 11, the fibrous portion 13 may become gradually less breathable from the inner circumferential side toward the outer circumferential side in the circumferential wall 12. This allows, in a well-balanced manner, the inner layer 14 to attenuate the pressure of a sound wave of air flowing inside the circumferential wall 12 and the outer layer 15 to limit the entry of air outside the circumferential wall 12 into the circumferential wall 12 by controlling the airflow in the fibrous portion 13 of the circumferential wall 12.

In this case, the fibrous portion 13 of the circumferential wall 12 may have a single-layer structure in which the inner layer and the outer layer are integrated with each other, or may have a laminated structure that includes two or more layers. When the fibrous portion 13 has a laminated structure, the fibrous portion 13 may become gradually less breathable in each layer from the inner circumferential side toward the outer circumferential side in the circumferential wall 12.

Figure 2:
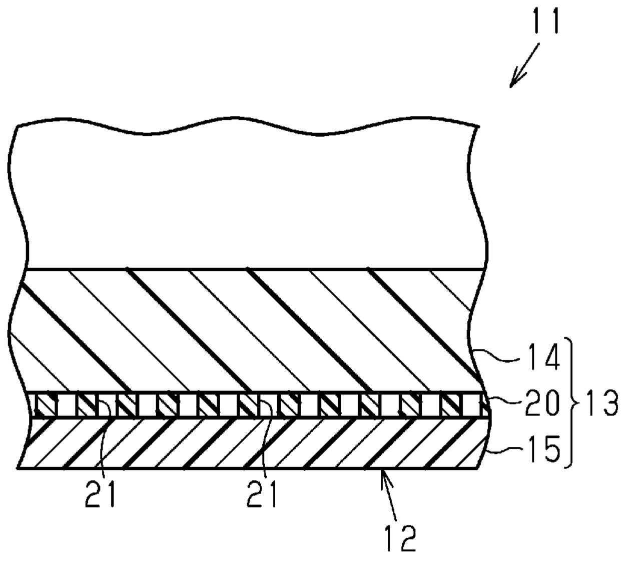
FIG. 2 is an enlarged cross-sectional view showing the main part of a duct according to a modification.

As shown in FIG. 2, the fibrous portion 13 of the circumferential wall 12 in the duct 11 may include a non-breathable film layer 20 located between the inner layer 14 and the outer layer 15. In this case, holes 21 are formed so as to extend through the film layer 20 when the inner layer 14 is joined to the outer layer 15 through needle punching. Further, in this case, the outer layer 15 has a greater breathability than the film layer 20. This allows the film layer 20 to control the airflow in the fibrous portion 13.

In other words, the outer layer 15 of this modification does not control the airflow in the fibrous portion 13. In such a structure, the opening areas of the holes 21 extending through the film layer 20 are precisely calculated based on the number and diameters of the needles used for needle punching. This allows the airflow in the fibrous portion 13 to be controlled accurately.

Figure 3:
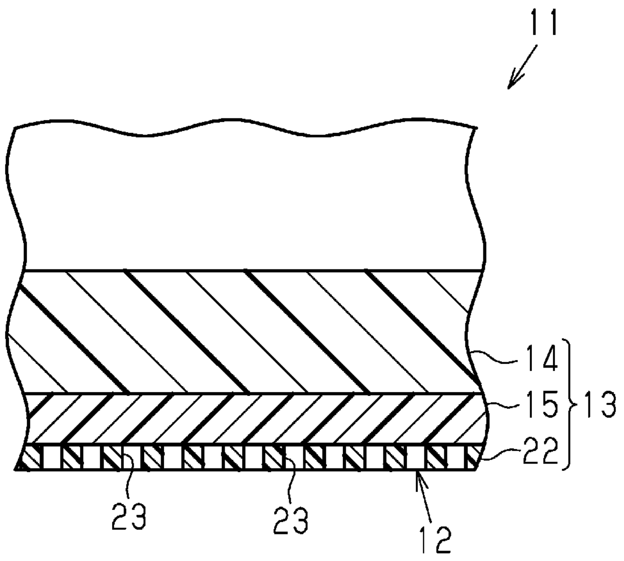
FIG. 3 is an enlarged cross-sectional view showing the main part of a duct according to a modification.

As shown in FIG. 3, the fibrous portion 13 may include a coating layer 22 that covers the outer circumferential surface of the outer layer 15 on the outer circumferential side of the outer layer 15 in the circumferential wall 12. In this case, the coating layer 22 may be formed through printing such that through-holes 23 extend through the coating layer 22. That is, the coating layer 22 may be formed by discharging coating liquid on, for example, the outer circumferential surface of the outer layer 15 from the head nozzle of an inkjet printer (not shown). Here, coating liquid made of synthetic resin is used to form the coating layer 22.

Further, in this case, the outer layer 15 has a greater breathability than the coating layer 22. This allows the coating layer 22 to control the airflow in the fibrous portion 13. In other words, the outer layer 15 of this modification does not control the airflow in the fibrous portion 13. In such a structure, the opening areas of the through-holes 23 in the coating layer 22 are precisely calculated based on the setting of the inkjet printer, which discharges coating liquid. This allows the airflow in the fibrous portion 13 to be controlled accurately.

Figure 4:
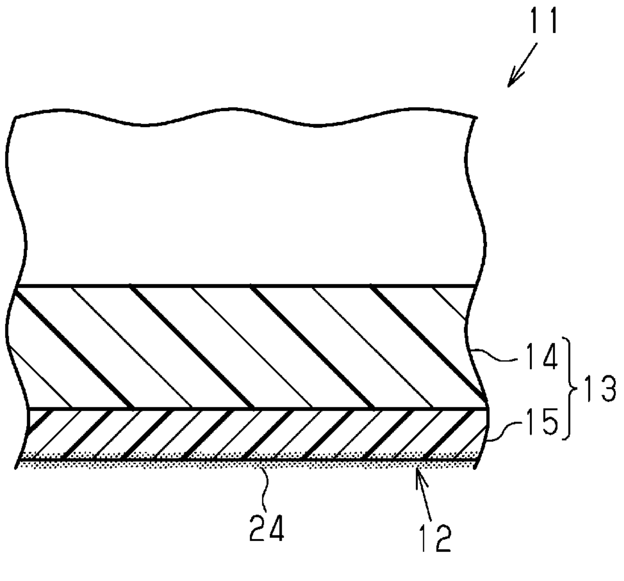
FIG. 4 is an enlarged cross-sectional view showing the main part of a duct according to a modification.

As shown in FIG. 4, in the duct 11, water repellent 24 may be applied to the outer circumferential surface of the outer layer 15. That is, the outer circumferential surface of the outer layer 15 may be, for example, coated with fluorine so as to be water-repellent. In this case, the water repellent 24 is applied to the outer circumferential surface of the outer layer 15 so as to maintain the breathability of the outer layer 15.

Figure 5:
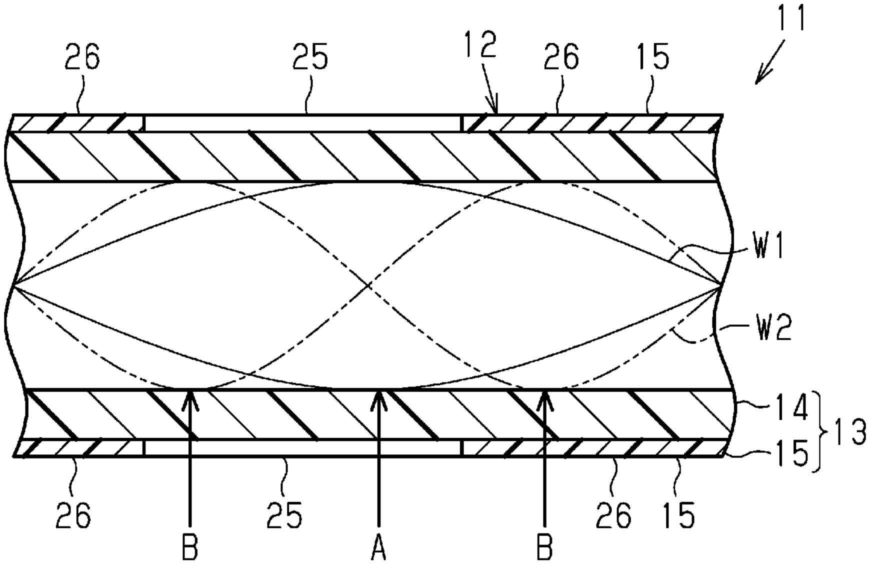
FIG. 5 is a cross-sectional view showing part of a duct according to a modification.

As shown in FIG. 5, in the duct 11, the outer layer 15 may include a breathable part 25, which has breathability, and non-breathable parts 26, which do not have breathability. The breathable part 25 may be located in correspondence with a position corresponding to the antinode of a stationary wave of a sound wave of air flowing inside the circumferential wall 12. In the outer layer 15, the breathable part 25 (non-hatched area in the outer layer 15 of FIG. 5) is sized such that the densities of fibers allow for breathability. In contrast, each non-breathable part 26 (hatched area in the outer layer 15 of FIG. 5) is sized such that the densities of fibers do not allow for breathability.

Further, in this case, the breathable part 25 is located so as to cover position A and positions B. Position A corresponds to the antinode of a primary stationary wave W1 of stationary waves of a sound wave of air flowing inside the circumferential wall 12. Positions B correspond to the antinodes of a secondary stationary wave W2 of the stationary waves. The wavelength of the secondary stationary wave W2 is half the wavelength of the primary stationary wave W1, and the wavelength of a tertiary stationary wave W3 (not shown) is one-third of the wavelength of the primary stationary wave W1. That is, if the frequency of a stationary wave is doubled, then its wavelength will be halved. If the frequency of a stationary wave is tripled, then its wavelength will be one-third. Thus, the positions of the antinodes of tertiary and subsequent stationary waves (not shown) are always located between positions A and B, which respectively correspond to the antinodes of the primary stationary wave W1 and the secondary stationary wave W2.

FIG. 5 shows two positions B, which correspond to the antinodes of the secondary stationary wave W2. These positions B are symmetrical with respect to position A, which corresponds to the antinode of the primary stationary wave W1. Thus, as long as the breathable part 25 covers position A, which corresponds to the antinode of the primary stationary wave W1, and one of the two positions B, which correspond to the antinodes of the secondary stationary wave W2, the breathable part 25 covers all the positions that correspond to the tertiary and subsequent stationary waves (not shown).

In such a structure, the breathable part 25 is located at a position where the pressure of sound waves having multiple frequencies of air flowing inside the circumferential wall 12 is the highest, and the non-breathable parts 26 are located at positions other than the breathable part 25. Thus, the entire circumferential wall 12 reduces the radiating noise released out of the circumferential wall 12 and reduces the air entering the circumferential wall 12 from the outside of the circumferential wall 12. That is, the entire circumferential wall 12 reduces the radiating noise released out of the circumferential wall 12 and reduces the pressure drop of air flowing inside the circumferential wall 12.

Figure 6:
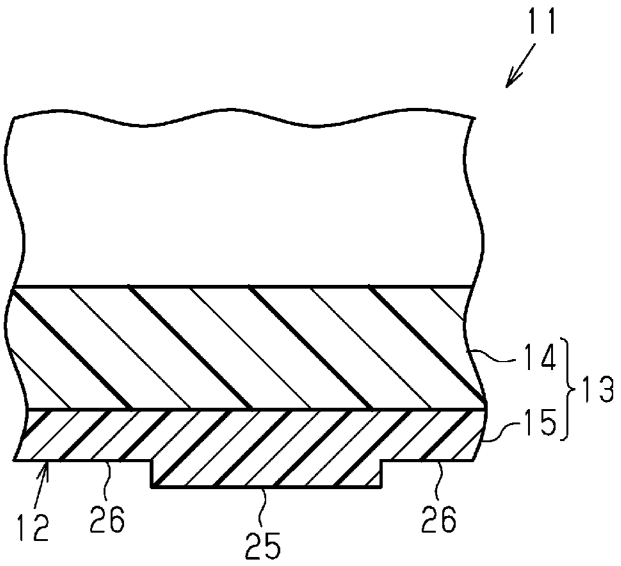
FIG. 6 is an enlarged cross-sectional view showing the main part of a duct according to a modification.
Figure 7:
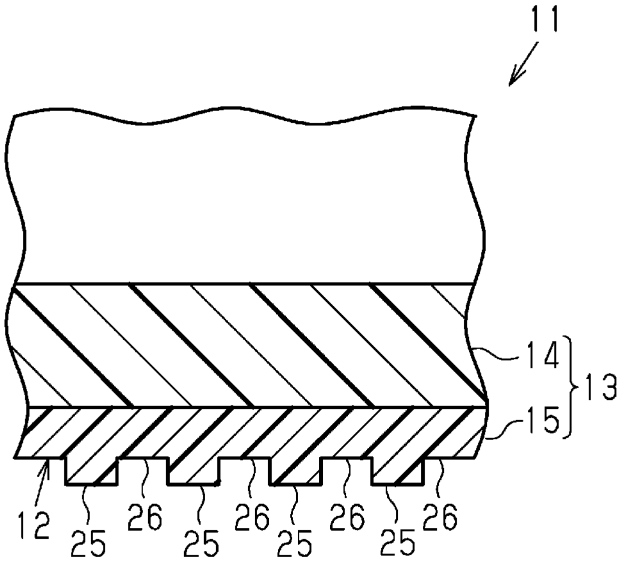
FIG. 7 is an enlarged cross-sectional view showing the main part of a duct according to a modification.

As shown in FIGS. 6 and 7, breathable parts 25, which are breathable, and non-breathable parts 26, which are not breathable, may be disposed on the outer layer 15 by changing the compressibility depending on its positions. In this case, the non-breathable parts 26 are thin high-compression parts of the outer layer 15, and the breathable parts 25 are thick low-compression parts of the outer layer 15. The outer layer 15 may include three types of portions that differ from each other in compressibility.

In the duct 11, the entire circumferential wall 12 does not have to be the fibrous portion 13, which is breathable. That is, part of the circumferential wall 12 may be the fibrous portion 13.

In the duct 11, the inner layer 14 does not have to be thicker than the outer layer 15. That is, the inner layer 14 may have the same thickness as the outer layer 15 or may be thinner than the outer layer 15.

In the duct 11, the boundary 16 does not have to be more breathable than the outer layer 15. That is, the boundary 16 may have the same breathability as the outer layer 15 or may be less breathable than the outer layer 15. In a case where the boundary 16 is less breathable than the outer layer 15, the boundary 16 controls the airflow in the circumferential wall 12 whereas the outer layer 15 does not control the airflow in the circumferential wall 12.

In the duct 11, the boundary 16 may be less breathable than the inner layer 14.

The duct 11 does not have to be tubular. Instead, the duct 11 may have a polygonal (e.g., rectangular or hexagonal) tubular shape or may have an oval tubular shape.

The invention claimed is:

1. A duct comprising a circumferential wall, at least part of the circumferential wall being a fibrous portion that includes fibers, wherein the fibrous portion includes: a breathable inner layer located on an inner circumferential side in the circumferential wall; and an outer layer located on an outer circumferential side of the inner layer in the circumferential wall, the outer layer being less breathable than the inner layer; a boundary between the inner layer and the outer layer is breathable, wherein the inner layer and the outer layer are joined to each other by interlacing fibers of the inner layer and the outer layer, wherein the fibrous portion becomes gradually less breathable from the inner circumferential side toward the outer circumferential side in the circumferential wall, and wherein the duct is an intake duct for an engine.

2. The duct according to claim 1, wherein the boundary is more breathable than the outer layer.

3. The duct according to claim 1, wherein the inner layer is thicker than the outer layer.

4. The duct according to claim 1, wherein the outer layer includes a breathable part that has breathability and a non-breathable part that does not have breathability, and the breathable part is located in correspondence with a position corresponding to an antinode of a stationary wave of a sound wave in air flowing inside the circumferential wall.

* * * * *